(No Model.) 3 Sheets—Sheet 1.
E. M. BOYNTON.
BICYCLE PASSENGER CAR.
No. 439,770. Patented Nov. 4, 1890.
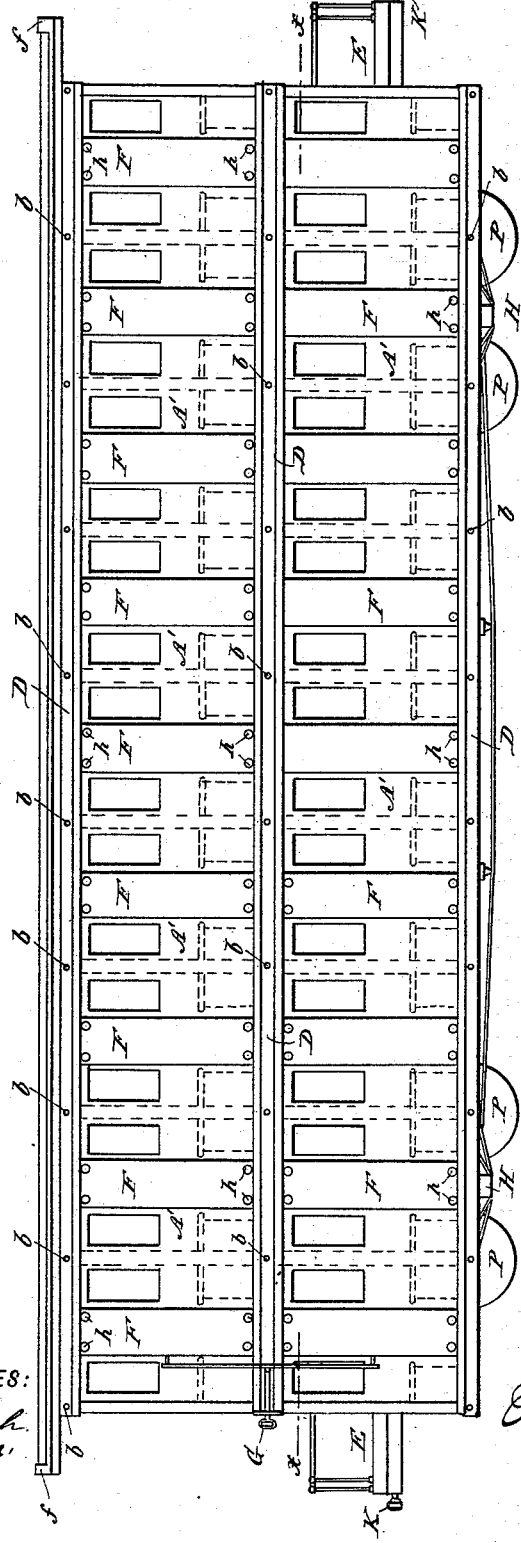
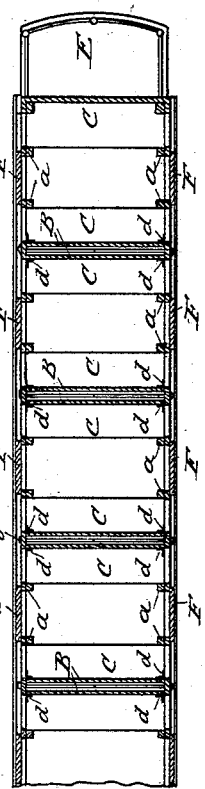
WITNESSES:
D. C. Reusch.
Chas. H. May.
INVENTOR
E. Moody Boynton.
BY
Iaen S. Storer,
ATTORNEY.

(No Model.) 3 Sheets—Sheet 2.
E. M. BOYNTON.
BICYCLE PASSENGER CAR.
No. 439,770. Patented Nov. 4, 1890.
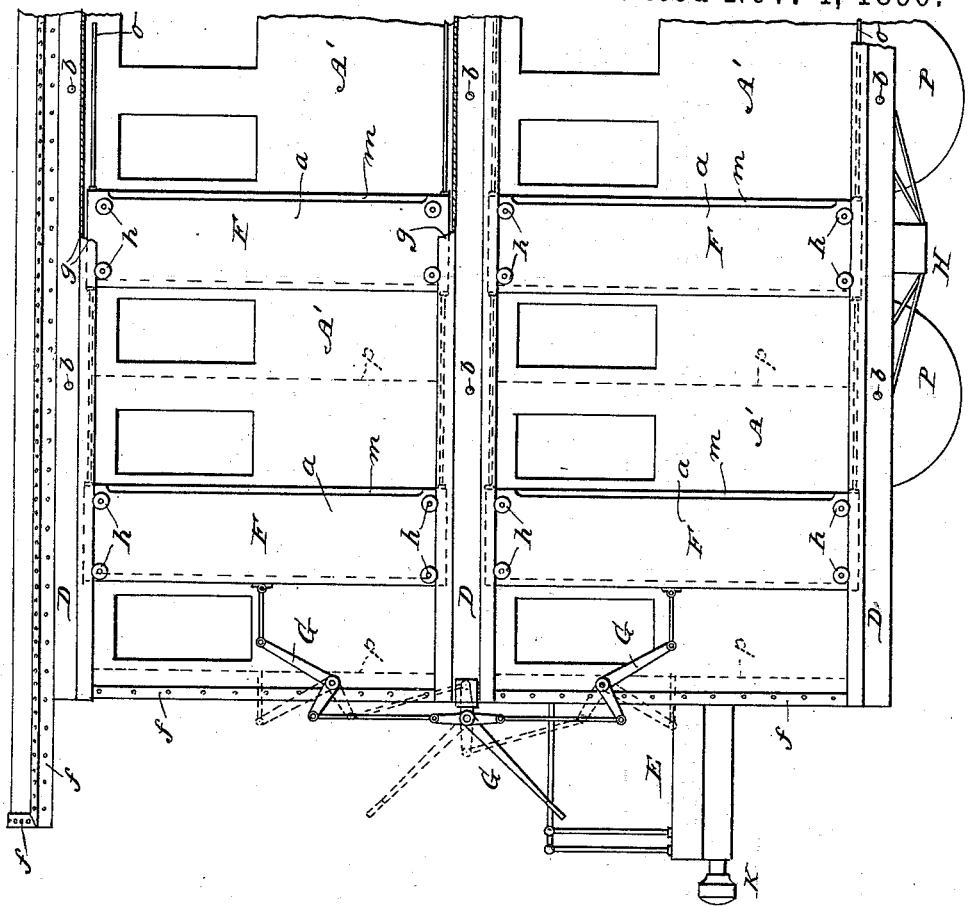
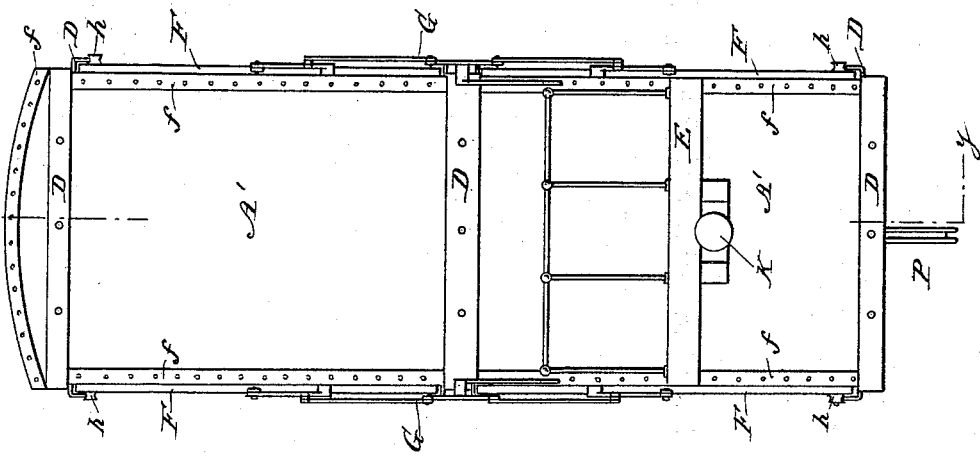
WITNESSES:
D. C. Reusch.
Charles H. May.
INVENTOR
E. Moody Boynton,
BY
Isaac S. Storer,
ATTORNEY.

(No Model.) 3 Sheets—Sheet 3.

E. M. BOYNTON.
BICYCLE PASSENGER CAR.

No. 439,770. Patented Nov. 4, 1890.

WITNESSES:  
INVENTOR  
E. Moody Boynton  
BY Jacob I. Storer  
ATTORNEY.

UNITED STATES PATENT OFFICE.

EBEN MOODY BOYNTON, OF WEST NEWBURY, MASSACHUSETTS.

BICYCLE PASSENGER-CAR.

SPECIFICATION forming part of Letters Patent No. 439,770, dated November 4, 1890.

Application filed March 5, 1890. Serial No. 342,689. (No model.)

*To all whom it may concern:*

Be it known that I, EBEN MOODY BOYNTON, of West Newbury, county of Essex, and State of Massachusetts, have invented certain new and useful Improvements in Bicycle Passenger-Cars, of which the following is a full, clear, and exact description, reference being had to the accompanying drawings, and to the letters of reference marked thereon.

The object of this invention is to provide an improved passenger-car especially adapted for bicycle-railways—a car that combines to an eminent degree strength with lightness and cheapness of construction with durability.

The invention consists in various novel features, all of which will be hereinafter fully set forth and then definitely claimed.

Reference is to be had to the accompanying drawings, forming part of this specification, in which similar letters of reference indicate corresponding parts in all the figures.

Figure 5:
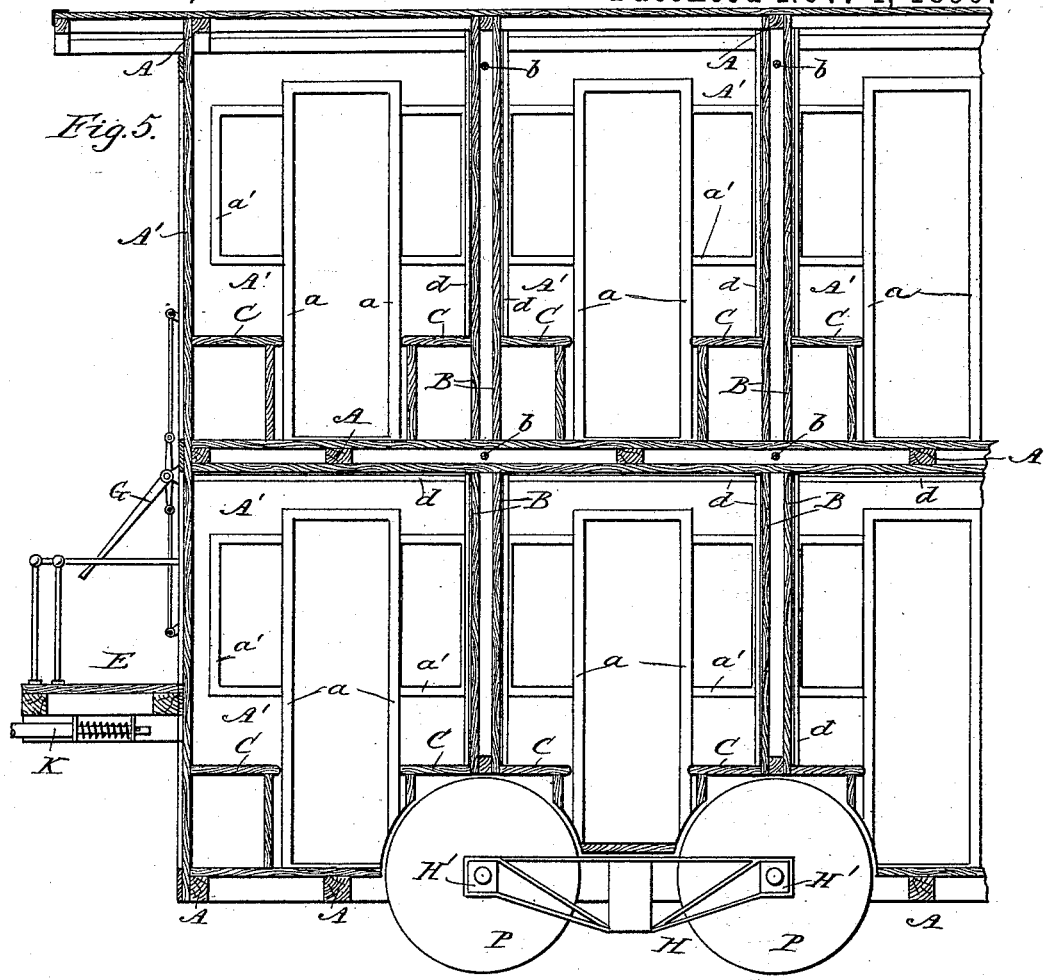
Figure 6:
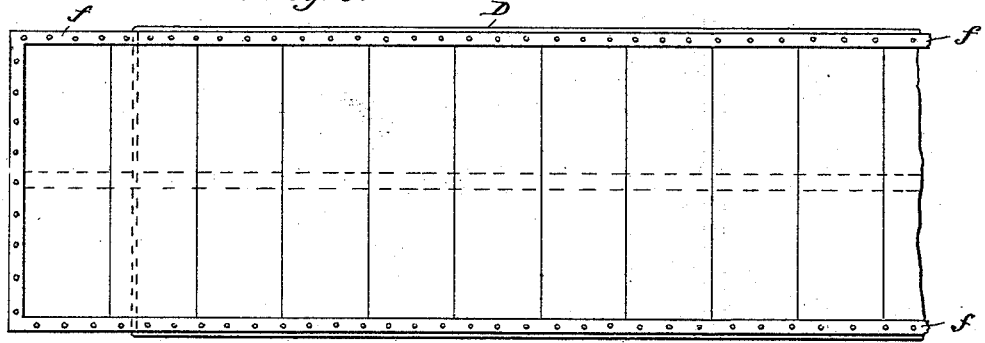

Figure 1 is a side elevation of my improved car. Fig. 2 is a longitudinal section thereof on line $x\ x$, Fig. 1. Fig. 3 is an enlarged end elevation of the same. Fig. 4 is an enlarged partly sectional side elevation of an end section of a car. Fig. 5 is an enlarged sectional side elevation of the same on line $y\ y$, Fig. 3. Fig. 6 is a plan of the same.

In the drawings a two-storied car with side doors is shown in order to better illustrate certain novel points of car construction that would not be so especially applicable to a car of one story.

The frame-timbers A of the car are made as light as possible consistent with the desired strength and rigidity and are designed to be put together in the usual manner with bolts, brace-rods, &c., and the shell A' of the car consists of triple or three-ply veneer, the layers of which are united with water-proof glue or with rivets and burrs, or both, or in any other effective manner. Preferably the sheets of veneer that form the sides and ends of the car run vertically, and are long enough to reach from lower floor to roof, and thus operate to better bind the two stories together. Preferably, also, after the veneer-covering is in place the openings for the doors and windows are cut out, and the door and window frames $a\ a'$, respectively, are then applied in place in such a manner as to assure water-tight joints all around said openings; but though this method of procedure in constructing the car is preferable I do not confine myself to it, for the car may be built up in the usual manner, if desirable, of leaving open the spaces designed for the door and window openings. This covering or shell of veneer is used because of its tensile strength and lightness, and because for a given strength it makes a thinner covering than boards, and consequently occupies less space, which is quite an advantage on narrow double-tracked bicycle-railways where trains are designed to be run with the least space between them laterally that is consistent with safety.

To increase the strength of the car, it is made cellular by veneer partitions B, fixed transversely between the car sides and reaching from bottom to top of each car cell or compartment. These partitions are double and hollow, as best shown in Fig. 5, so that the transverse bracing-bolts $b$ may be passed through them and concealed from sight. Along the joints made by the contact of the partitions B with the sides of the car beadings or strips $d$ are fixed in place, as shown in Fig. 5, to cover the joints and at the same time to better hold the partitions in place, and like beadings or strips of wood or metal may be applied over all the floor and ceiling joints. In a two-storied car, as shown, the partitions B may be made to extend from the lower floor to the roof through the ceiling of the lower story and the floor of the upper story; but the construction shown in Fig. 5 is for many reasons the preferable one. The seats C are also preferably constructed of veneers for the sake of combined strength and lightness.

Three broad bands D of steel or iron or other suitable metal are secured longitudinally around the car, one band just beneath the car-roof, another around the bottom, and the third around the central part of the car. Through countersunk holes in these bands D the transverse bolts $b$ are passed from side to side of the car, so that when nuts are turned on the threaded ends of said bolts the car is well braced transversely, and the bolt-heads and nuts will be out of the way in the countersinks of said bands.

The car-corners are designed to be strengthened and protected with angle-irons $f$, as best shown in Figs. 3 and 4, and so, also, are the edges of the car-roof.

The car-platforms E are designed to be of the usual construction; but in a two-storied car with doors on each side and floor, as herein shown, the platform is designed to be placed high enough for the conductor or brakeman standing thereon to have a clear view of both stories, so that he may see when to close or open the doors. These doors F are sliding doors, and their tops and bottoms are held from lateral motion in the grooves $g$, formed by the offset edges of the metal bands D, as best shown in Fig. 4, and said doors are provided at tops and bottoms with laterally-projecting rollers $h$, that bear on and against the edges of said bands and permit the doors to be moved with a minimum of friction. The forward edges of these doors are cut away or recessed to the depth of an inch or thereabout, and strips $m$ of rubber are secured thereon, as shown in Fig. 4, so that should a door be accidentally closed on a passenger's fingers no severe injury would result therefrom.

Each compartment of the car has a door on each side, so that there are four sets or series of doors, two sets on the lower story and two on the upper story of the car. The doors of each series are connected with one another at top and bottom by rigid rods $o$, as best shown in Fig. 4, so that they may all be simultaneously opened and closed by the operator on the car-platform.

By suitable simple mechanism each series of doors may be opened and closed independently of any of the series; but preferably I operate simultaneously all the doors on one side of the car, and to this end I make use of a compound lever G, (best shown in Figs. 3, 4, and 5,) two of whose members are secured, respectively, to the rear edges of the doors nearest the car end, while the lever-handle projects within reach of an operator on the car-platform, the lever being fulcrumed on the car side at the end thereof. When this lever is moved into the position shown in full lines, Fig. 4, the attached car-doors and those connected therewith by rods $o$ are thereby closed, and when it is moved to the position indicated in dotted lines, Fig. 4, the doors are thereby fully opened to the dotted lines $p$, and the said lever may be set or fixed at any point intermediate between the fully-closed and fully-opened positions for the partial closing or opening of the doors. This compound-lever construction and arrangement for operating the car-doors is effective; but I do not confine myself to it or to any particular device for sliding the doors back and forth, my object being to slide one or more series of the doors simultaneously by some suitable device operated from the car-platform, whether it be by means of a single or compound lever or levers, by combination of chains and pulleys, or by other effective mechanical contrivance.

The upper plates of the trusses H H, which connect the axle-boxes H' H', instead of being bent upward, as usual, are made horizontal in order that they may not project upward to be inconveniently in the way of the door-entrances.

The draw-bars K are preferably located just beneath the platforms, as shown; but they may be placed in lower positions and be extended inward beneath car end seats, if desirable.

The car-wheels P are designed to be doubly flanged with deep peripheral grooves and to project for about half their diameter up beneath the seats of the car, as indicated in Fig. 5, where they are hidden from view.

Having thus described my invention, I claim as new and desire to secure by Letters Patent—

1. A passenger-car divided into compartments by a series of double partitions extending vertically from floor to ceiling and a series of bracing-bolts passing through said partitions from side to side of the car, substantially as described.

2. A passenger-car divided into a series of compartments by a series of partitions extending vertically from floor to ceiling, a metallic band surrounding the body of the car, and a series of brace-bolts, each bolt running through said double partitions and through a band on the opposite sides of the car, substantially as described.

3. A passenger-car having a strengthening-band inclosing the sides and extending longitudinally around the same and provided with a series of bracing-bolts, each of which bolts passes through said car, the sides, and through the band on both sides of said car, substantially as described.

4. In a passenger-car having strengthening-bands extending around it, a series of sliding doors having anti-friction rollers sliding on said bands, substantially as described.

5. The combination of a car having two series of openings in the side, with two corresponding series of sliding doors F, each series connected together by a series of rods $o$, and a system of compound levers G, whereby both series of doors are opened and closed simultaneously, all substantially as described and shown.

6. A passenger-car having sliding doors with their edges cut away between the top and bottom, leaving a recess of the full thickness of the door, and a strip of elastic material set in said recess, substantially as shown and described, and for the purpose set forth.

In testimony that I claim the foregoing I have hereunto set my hand, in the presence of two witnesses, this 21st day of February, 1890.

EBEN MOODY BOYNTON.

Witnesses:
JACOB J. STORER,
CHAS. H. LOTT.